United States Patent [19]

Hildebrecht

[11] 4,408,775

[45] Oct. 11, 1983

[54] APPARATUS FOR SUSPENDING A TRUNNION MOUNTED AXLE ASSEMBLY FROM A VEHICLE

[75] Inventor: Harold V. Hildebrecht, Cleveland, Ohio

[73] Assignee: Tewmotor Corporation, Mentor, Ohio

[21] Appl. No.: 275,080

[22] PCT Filed: Jan. 26, 1981

[86] PCT No.: PCT/US81/00121

§ 371 Date: Jan. 26, 1981

§ 102(e) Date: Jan. 26, 1981

[87] PCT Pub. No.: WO82/02519

PCT Pub. Date: Aug. 5, 1982

[51] Int. Cl.³ .............................................. B60G 11/02
[52] U.S. Cl. ............................. 280/95 R; 280/112 R
[58] Field of Search .................... 280/95 R, 93, 112 R

[56] References Cited

U.S. PATENT DOCUMENTS

| | | | |
|---|---|---|---|
| 2,835,507 | 5/1958 | Davies | 280/112 |
| 3,080,175 | 3/1963 | DeMarco | 280/95 |
| 3,086,791 | 4/1963 | Ulinski | 280/95 |
| 3,243,198 | 3/1966 | Simovich | 280/112 R |
| 3,528,677 | 9/1970 | Evans et al. | 280/95 |
| 3,773,348 | 11/1973 | Davis | 280/112 R |

Primary Examiner—Richard A. Bertsch
Attorney, Agent, or Firm—Alan J. Hickman

[57] ABSTRACT

Trunnion mounted axle assemblies are used on farm tractors, fork lift trucks, golf carts, and earth moving vehicles such as front end loaders. Normally, such axles are mounted by pillow blocks to the vehicle frame and rotation of the axle is resisted by resilient elastomeric bushings which act as torsion springs. These bushings do not provide as long a service life as desired and must frequently be replaced. The present invention overcomes this problem by providing a resisting bar (42) rigidly attached to the end of each trunnion (30) and a resisting cap (44) containing a resiliently deformable member (46). The bar (42) is received in a slot (48). The assembly can be adjusted as necessary to compensate for wear.

7 Claims, 3 Drawing Figures

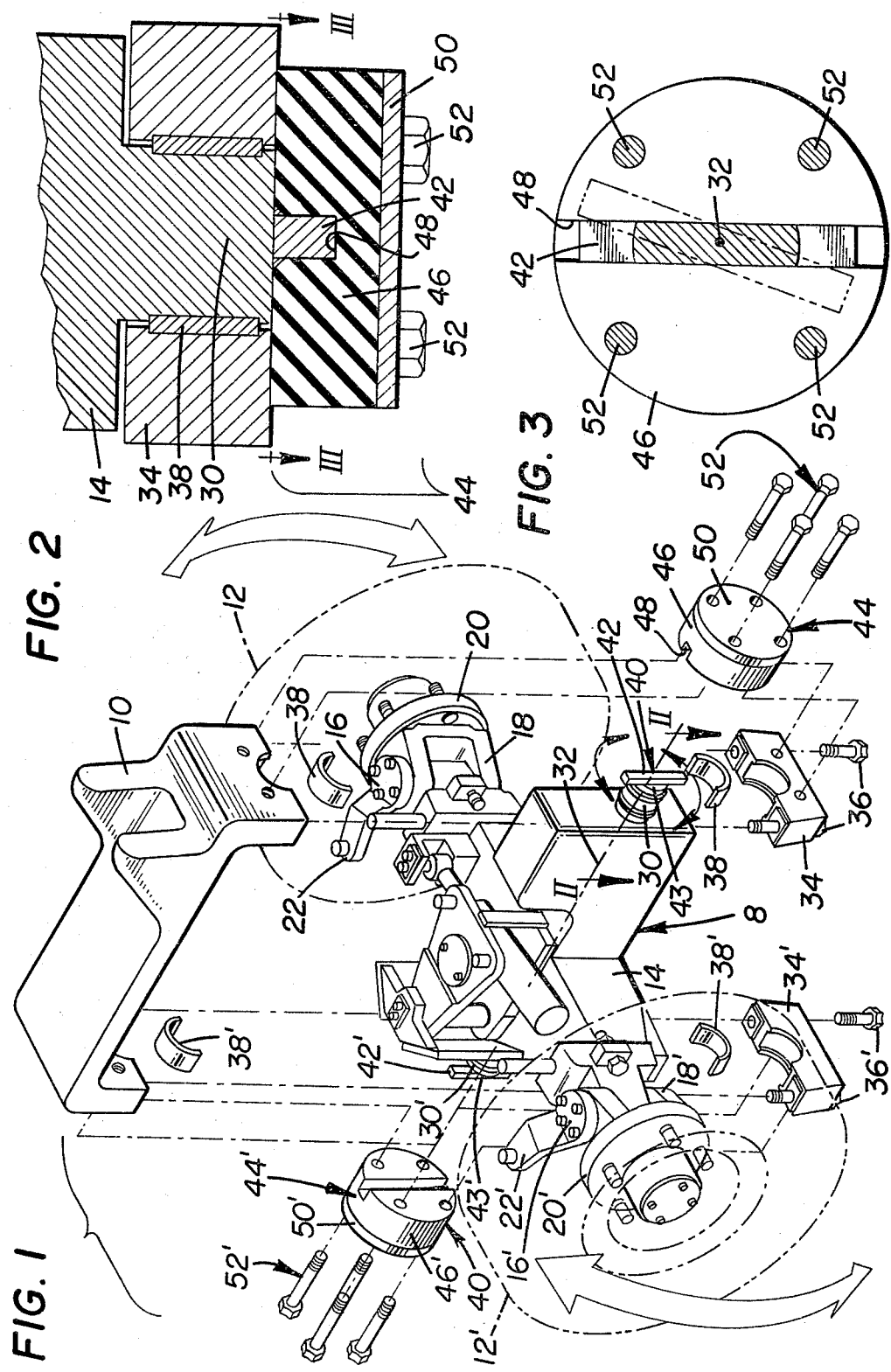

APPARATUS FOR SUSPENDING A TRUNNION MOUNTED AXLE ASSEMBLY FROM A VEHICLE

DESCRIPTION

1. Technical Field

This invention generally relates to vehicle suspension systems and more particularly to trunnion mounted axles.

2. Background Art

Farm tractors, fork lift trucks, golf carts, and earth moving vehicles such as front end loaders utilize trunnion or journal mounted axles. Normally, a trunnion mounted axle is mounted by pillow blocks to the frame of the vehicle. The common axis of rotation of the trunnions is parallel to the longitudinal axis of the vehicle and its direction of motion.

Between the trunnions and the pillow blocks are resilient elastomeric bushings that are loaded both in compression and shear. The compression forces are due to the weight of the vehicle and the forces on the axle transmitted from the roadway. In particular, the weight of the vehicle bears down on the pillow blocks and compresses the bushings which, in turn, transmits this force to the trunnions, the axle and the wheels. The bushings are loaded in shear to resist rotation of the axle about the longitudinal axis of the vehicle.

Examples of trunnion mounted axles are disclosed in the following patents: U.S. Pat. No. 2,835,507 entitled "Axle Mounting For A Vehicle," issued to Davies on May 20, 1958; U.S. Pat. No. 3,080,175 entitled "Industrial Truck and Rocking Wheel Assemblage Therefor," issued to De Marco on Mar. 5, 1963; U.S. Pat. No. 3,080,175 entitled "Industrial Truck and Rocking Wheel Assemblage Therefor," issued to De Marco on Mar. 5, 1963; U.S. Pat. No. 3,086,791 entitled "Industrial Truck Steering," issued to Ulinski on Apr. 23, 1963; and U.S. Pat. No. 3,528,677 entitled "Suspension Assembly for Industrial Trucks," issued to Evans et al. on Sept. 15, 1970 and assigned to the assignee of the present invention.

The elastomeric bushings used around the trunnion shafts in these prior suspension systems generally have not provided as long a service life as desired. These bushings are designed to resist rotation of the axle of the vehicle by clamping around the trunnion shafts and acting like torsion springs. Rotation of the trunnion shafts causes the bushings to lose their resilience and to wear away. This wearing away causes the bushings to become loose and as a consequence to induce looseness in the axle suspension system. These prior systems also have no provisions for adjustably tightening the bushings as wear proceeds and thus when such looseness occurs, the bushings must be replaced.

The present invention is directed to overcoming one or more of the problems as set forth above.

DISCLOSURE OF THE INVENTION

In one aspect of the present invention an axle assembly for a vehicle frame having an axle and a trunnion suspended from the frame is contemplated. The improvement comprises a member attached to the trunnion and located transversely relative to the axis of rotation of the trunnion and means for resiliently resisting rotation of the member and the trunnion with respect to the frame.

The present invention solves the problem of frequent replacement of the elastomeric bushings by providing means for adjustably securing the resilient resisting means. The apparatus disclosed herein permits the resilient resisting means to be tightened down as necessary as wear occurs so that the axle does not become loose.

The present invention also solves the problem of reducing wear in the suspension system by no longer having elastomeric bushings support the weight of the vehicle and no longer having the bushings loaded in shear. In the present invention when the trunnion shaft is rotated, the shaft turns the member which loads the resisting means in compression.

Other aspects, objects and advantages of this invention can be found from a study of the drawings, the disclosure and the appended claims.

BRIEF DESCRIPTION OF THE DRAWINGS

FIG. 1 is an exploded perspective view of an embodiment of the present invention.

FIG. 2 is a partial sectional view taken along the line II—II of the embodiment of FIG. 1, with the illustrated parts shown in their assembled form.

FIG. 3 is a cross sectional view taken along line III—III of the embodiment of FIG. 2.

BEST MODE FOR CARRYING OUT THE INVENTION

Referring to the figures, FIG. 1 illustrates a trunnion mounted axle assembly 8 for suspending two wheels 12,12', from a vehicle frame 10. Since the apparatus includes many identical parts, such as the wheels 12,12', such common parts are identified by the same numeral and distinguished by primes. The axle assembly 8 includes a steering axle 14 that utilizes two king pins 16,16', to support two steering knuckles 18,18'. The wheels 12,12', are mounted on wheel rims which are each mounted on a hub 20,20'. The hubs 20,20' are each rotatabably mounted on a spindle that is connected to one of the steering knuckles 18,18'. The steering knuckles 18,18' are pivotal about the pins 16,16' by the steering arms 22,22'. These components are of known construction.

The axle 14, FIG. 1, further includes two trunnion shafts 30,30', or journals which have a common axis of rotation 32 that is parallel to the longitudinal centerline (not shown) of the vehicle. The axis of rotation is also aligned in the direction of motion of the vehicle. The axle assembly 8 further includes means 40 for supporting the trunnions 30,30' relative to two pillow blocks 34,34' of conventional construction and the supporting means 40 at each end of the axle assembly 8 are identical. The pillow blocks are secured to the frame 10 with bolts 36,36'. Each trunnion is supported in a pillow block by a split bushing 38,38'. These bushings can be either bronze or steel-backed bearings and provide substantially no resistance to the rotation of the trunnions about the axis of rotation 32. The bushings transmit the weight of the vehicle through the frame 10 to the steering axle 14.

Referring to FIGS. 1 and 2, the trunnion suspension means 40,40' includes a resisting bar 42,42' welded to an end wall 43 of each trunnion shaft 30,30'. Each resisting bar is elongate, rigid, rectangular in cross section and located transversely (preferably perpendicular) to the axis of rotation 32 of the trunnions. The bar is a rigid member that rotates about the axis 32 in response to rotative motion of the steering axle 14.

Referring to FIGS. 1, 2 and 3, each trunnion shaft 30,30' and resisting bar 42,42' is engaged by a resisting cap 44,44' that is bolted to the end face of a respective pillow block 34,34'. It should be noted that the resisting cap 44 may be bolted to any member fixed relative to the axle or trunnion. The resisting cap includes a resiliently deformable member 46,46' having a generally circular cross section and fabricated from an elastomeric material such as rubber. The deformable member 46,46' has an elongate slot 48,48' in one face that is sized to receive the resisting bar 42,42' in slip-fit relationship. Each resisting cap 44 also includes a non-deformable compression plate 50,50' that is fabricated from steel. The cap 44,44' is rigidly secured to the pillow block 34,34' by a plurality of bolts 52,52' that pass through the compression plate 50,50' and the deformable member 46,46'.

INDUSTRIAL APPLICABILITY

The axle assembly 8 described above can be incorporated into any vehicle having a pivotally supported axle. Such vehicles include tractors, golf carts, fork lift trucks and earth moving vehicles, such as front end loaders.

The axle assembly 8 is installed on the frame 10 of the vehicle by first securing the trunnion shafts 30,30' in position with the pillow blocks 34,34'. The steering axle 14 is free to rotate within the pillow blocks about the axis 34 because the bearings 34,34' provide no torsional resistance. After the steering axle 14 is in position, the bolts 52,52' are passed through the resisting caps 44,44' and are torqued in place to provide a predetermined amount of resilient restraint against the motion of the resisting bar 42,42' as described below.

In operation, when subjected to exterior forces the steering axle 14 and the frame 10 rotate relative to each other about the axis of rotation 32. Motion of the steering axle 14 is transmitted to the resisting bars 42,42' which are an integral part of the axle. Rotation of the bars about the axis 32 loads the resiliently deformable members 46,46' in compression as illustrated in FIG. 3. The resisting caps 44,44' are rigidly bolted to the stationary pillow blocks 34,34' with the bolts 52,52'. Thus, the rotation of the rigid bars 42,42' about the axis 32 is resiliently restrained by the deformable members 46,46'. In like manner, motion of the frame 10 is transmitted to the deformable members via the bolts 52,52' and rotation of the frame about the axis 32 is resiliently restrained by the resisting bars 42,42'.

If the resisting caps 44,44' are subjected to wear or become loose, the bolts 52,52' can be tightened, thereby forcing the compression plates 50,50' against the deformable members 46,46' and the pillow blocks 44,44'. This tightening compresses the deformable member and permits the desired resistance to motion of the resisting bar 42,42' to be developed. This tightening can be done again and again as required.

It should be appreciated that the present invention can be incorporated in any trunnion or journal mounted axle assembly and need not be used exclusively in steering axles as described herein. Further, the axle can be mounted with merely one trunnion instead of two and the rotational resistance can be increased by changing the type and diameter of the elastomeric material utilized in the resiliently deformable manner 46.

In view of the foregoing, it can be seen that the service life of the axle assembly 8 can be substantially increased by using the resisting bar 42 and the resisting cap 44 of the present invention. This cap and bar assembly can be adjusted as wear in the suspension system occurs to provide the desired level of resistance to rotation of the steering axle 14. Further, the service life of the axle assembly is increased by eliminating the need to have the elastomeric components of the apparatus bear the weight of the vehicle and by not subjecting these elastomeric components to cyclical shear forces that can cause abrasion.

Other aspects, objects and advantages of this invention can be obtained from a study of the drawings, the disclosure and the appended claims.

I claim:

1. In an axle assembly (8) for a vehicle frame (10) having an axle (14) and a cylindrical trunnion shaft (30), said cylindrical trunnion shaft having an end (43) and a longitudinal trunnion axis (32) and being rigidly connected to said axle (14), said longitudinal trunnion axis (32) being oriented normal to said elongate axle (14) and said trunnion shaft (30) being rotatable with and in response to pivotal movement of said axle (14), the improvement comprising:

means (34) for connecting said trunnion shaft (30) to said frame (10) and permitting only pivotal movement of said trunnion shaft (30) about said longitudinal trunnion axis (32);

a resisting member (42) rigidly securely affixed to the end (43) of said trunnion shaft (30) and rotatable with and in response to rotation of said trunnion shaft (30); and a resisting cap (44) having a resilient member (46) and being connected to one of said frame (10) and said connecting means (34) adjacent the end (43) of said trunnion shaft (30), said resilient member (46) being free from supporting the trunnion shaft (30) and engageable with said resisting member (42), said resilient member (46) being deformable in response to rotation of said resisting member (42) to resist rotation of said trunnion shaft (30).

2. The axle assembly (8) as set forth in claim 1 wherein said resisting cap (44) includes;

a compression plate (50) connected to one of said frame (10) and connecting means (34) adjacent the end (43) of said trunnion shaft (30) and on said longitudinal trunnion axis (32); said compression plate (50) being adjustably movable along said trunnion axis (32) and relative to said trunnion end (43) to compress said resilient member (46) and vary the rotational resistance applied to the trunnion shaft (30).

3. The axle assembly (8) as set forth in claim 2 wherein said means for connecting includes;

a pillow block (36) and a bearing (38), said trunnion shaft (30) being rotatably disposed in said bearing (38) and said bearing (38) being clampingly connected to said frame (10) by said pillow block (36).

4. The axle assembly (8) as set forth in claim 2 wherein said resisting member (42) includes;

an elongate rectangular shaped bar (42) transversely positioned relative to the longitudinal trunnion axis (32) and securely connected to the end (43) of said trunnion shaft (30).

5. The axle assembly (8) as set forth in claim 4 wherein said resilient member (46) has a slot (48) disposed therein and said elongate rectangular shaped bar (42) being disposed in said slot (48).

6. The axle assembly (8) as set forth in claim 5 wherein said resilient member (46) is connected to said compression plate (50) and compressibly disposed between said pillow block (34) and trunnion shaft end (43) and said compression plate (50).

7. The axle assembly (8) as set forth in claim 6, including;

a plurality of threaded fasteners (52) adjustably screwthreadably connecting said compression plate (50) and said resilient member (46) to said pillow block (34).

* * * * *